United States Patent [19]

Henning et al.

[11] 4,036,330

[45] July 19, 1977

[54] DISC BRAKE

[75] Inventors: Dale A. Henning; Jack D. Rainbolt, both of Troy, Ohio

[73] Assignee: The B. F. Goodrich Company, Akron, Ohio

[21] Appl. No.: 657,179

[22] Filed: Feb. 11, 1976

Related U.S. Application Data

[63] Continuation-in-part of Ser. No. 533,947, Dec. 18, 1974, abandoned.

[51] Int. Cl.² .......................................... F16D 55/224
[52] U.S. Cl. ..................................... 188/72.8; 192/94
[58] Field of Search ................. 188/72.3, 72.7, 72.8; 192/94

[56] References Cited

U.S. PATENT DOCUMENTS

| 1,922,307 | 8/1933  | Lambert ......................... 188/72.8 X |
| 2,612,968 | 10/1952 | Hood ............................. 188/72.8 X |
| 3,158,230 | 11/1964 | Chouings ....................... 188/73.3 X |
| 3,357,522 | 12/1967 | Bradley et al. ................ 188/72.8 |
| 3,675,741 | 7/1972  | Frei et al. ..................... 188/72.8 X |
| 3,690,417 | 9/1972  | Airheart ........................ 188/72.6 X |
| 3,727,728 | 4/1973  | Bostwick ....................... 188/79.5 R |
| 3,788,430 | 1/1974  | Hurt .............................. 188/72.8 X |

FOREIGN PATENT DOCUMENTS

421,725    4/1967    Switzerland ........................ 188/72.8

*Primary Examiner*—George E. A. Halvosa
*Attorney, Agent, or Firm*—William A. Shira, Jr.; Frederick K. Lacher

[57] ABSTRACT

A caliper type disc brake actuated by threaded members of a screw and nut assembly in which one of the members is axially movable but held against rotation and the other threaded member is rotatble relative to the caliper. The rotatable member is mounted for the application of force against the caliper during braking. Clamping force is applied to a friction lining carrier upon rotation of the rotatable threaded member in one direction. The threads of the threaded member have a helix angle and shape to cause overhauling rotation of the rotatable threaded member in the opposite direction upon release of the clamping force on the friction lining carrier for automatic return of the brake parts from a braking position to a position away from the disc.

10 Claims, 11 Drawing Figures

DISC BRAKE

This application is a continuation-in-part of applicants' copending application Ser. No. 533,947 filed Dec. 18, 1974 entitled "Disc Brake," now abandoned.

BACKGROUND OF THE INVENTION

Floating caliper brakes actuated by fluid pressure in a piston-cylinder assembly mounted on the caliper have been used heretofore mainly for passenger vehicles. Some of these designs have included screw adjusters to compensate for lining wear. These screw adjusters have also been utilized in some cases for parking brakes.

These piston-cylinder and screw adjuster type brake designs have not met the need for a floating caliper brake which can be actuated by air chambers of the type used on trucks and trailers for drum type brakes. The air chambers are connected to the brakes by rotatable cam shafts and the brakes are actuated by the rotation of the shafts. Accordingly, the floating caliper disc brake needed should be actuated by rotation of a shaft to apply clamping force against the brake disc through the floating caliper housing. In addition, there is the problem of quickly releasing the brake and restoring the friction linings and cam shaft to a position where the brake is ready to be actuated again. The connection between the air chamber and the floating caliper must also be maintained even though the caliper position changes.

SUMMARY OF THE INVENTION

The present invention provides a floating caliper brake with high torque capacity actuated by a shaft rotated by an arm connected to a piston of an air chamber. The brake includes a screw and nut assembly with threaded members mounted in such a manner that the clamping forces are applied to friction lining carriers on both sides of a brake disc and the caliper is movable to accommodate wear of the linings as well as adjustment for the position of the disc. In addition, the helix angle of the threads provides an overhauling torque causing the quick return of the friction lining carrier and shaft from braking positions to positions where these parts are ready for additional actuation of the brake. The connection between the air chamber and the floating caliper is also maintained at the various positions of the caliper.

DETAILED DESCRIPTION

Figure 1:
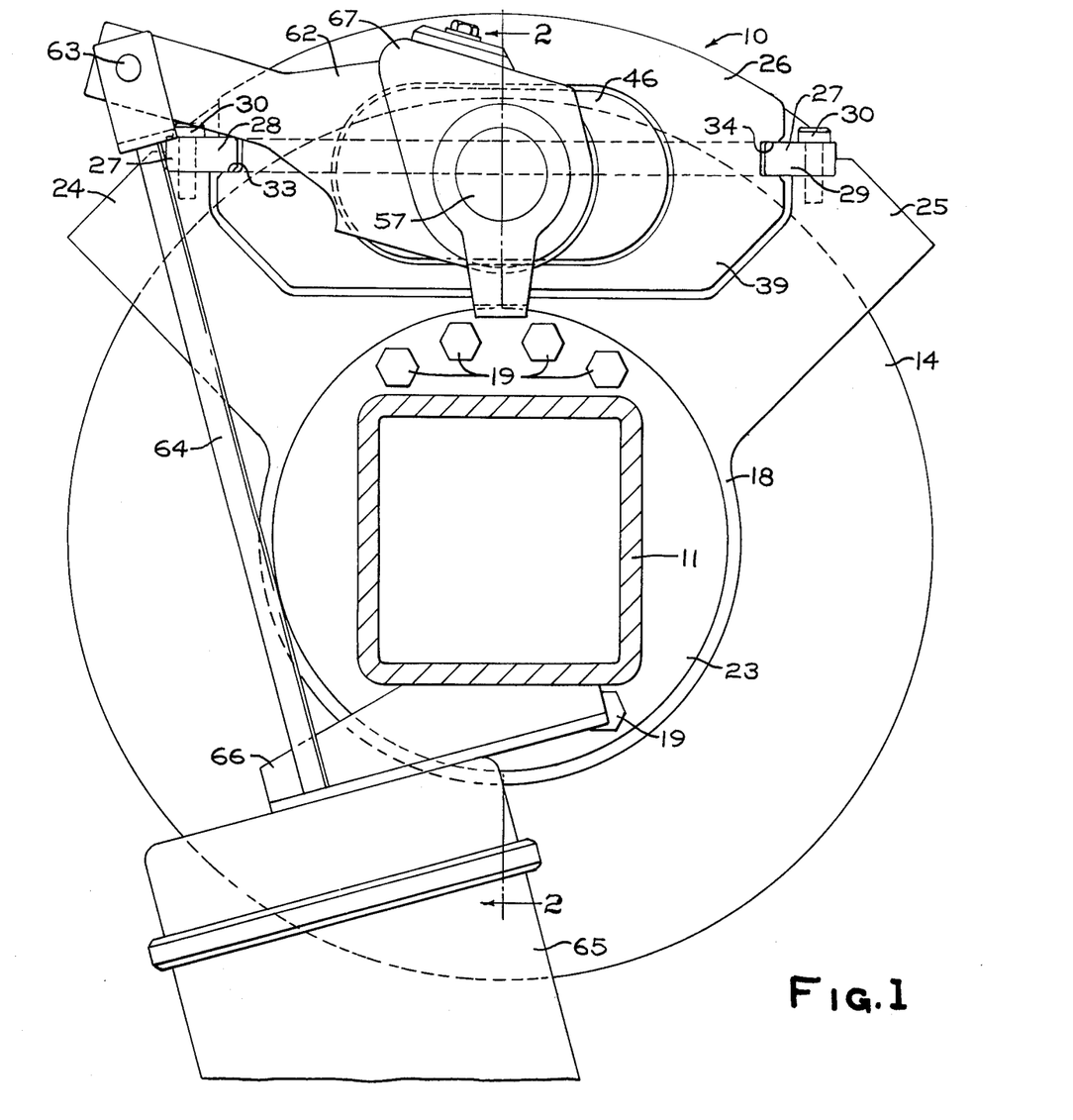
FIG. 1 is an end elevation of the inboard side of a caliper disc brake embodying the invention with a portion of the pneumatic chamber broken away.
Figures 2, 4:
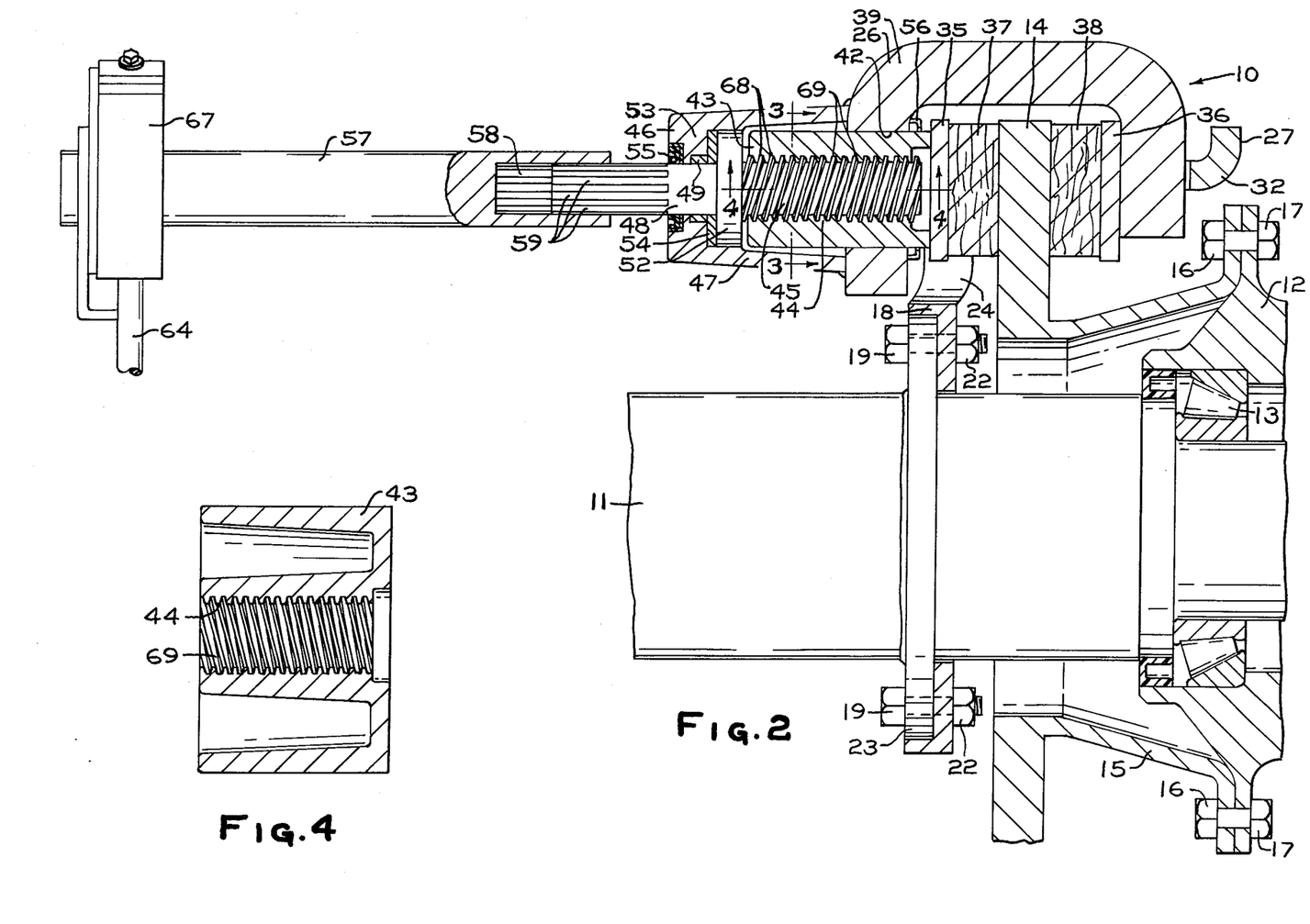
FIG. 2 is a fragmentary sectional view taken along the plane of line 2—2 of FIG. 1 with parts being broken away.
FIG. 4 is a longitudinal sectional view of the sliding piston taken along the plane of line 4—4 of FIG. 2.
Figure 3:
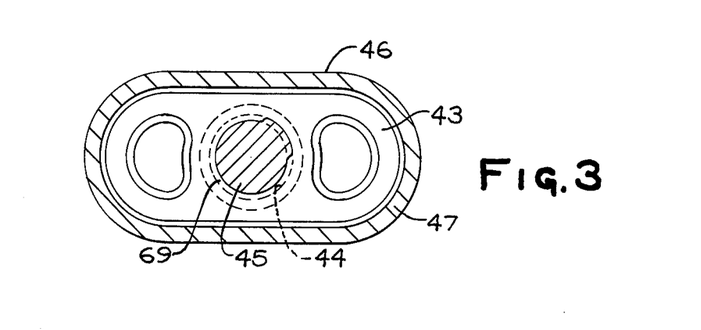
FIG. 3 is a cross-sectional end view of the sliding nut and cap taken along the plane of line 3—3 of FIG. 2.

A disc brake 10 is shown in FIGS. 1 and 2 for a vehicle such as a truck trailer having an axle 11. A wheel 12 of which a portion if shown in FIG. 2, is rotatably mounted on bearings 13 seated on the axle 11. A rotatable brake disc 14, which may be of steel or other wear-resistant material, is carried by the wheel 12 on an annular adapter 15 which has a flange abutting the wheel and connected to the wheel as by bolts 16 and nuts 17 extending through mating holes in the flange and wheel at spaced positions around the wheel.

A torque plate 18 is also fastened to the axle 11 by bolts 19 and nuts 22 extending through holes in the torque plate 18 and holes in a supporting flange 23 secured to the axle as by welding. The torque plate 18 has arms 24 and 25 extending radially outward from the axle 11 to spaced-apart positions at each side of a brake housing or floating caliper 26. A U-shaped supporting bracket 27 is fastened to the arms 24 and 25 of the torque plate 18 and has side members 28 and 29 held on the arms by bolts 30 providing substantially parallel rails at the sides of the caliper 26 and a connecting end member 32 extending between the side members at the outboard end of the caliper. The caliper 26 has slots 33 and 34 at the sides for sliding engagement with the side members 28 and 29, respectively.

Lining carriers 35 and 36 positioned on opposite sides of the brake disc 14 also have slots (not shown) in sliding engagement with the side members 28 and 29 of bracket 27. The lining carriers 35 and 36 support friction linings 37 and 38, respectively, which may be fastened to the lining carriers as by a suitable adhesive, integral bonding or by rivets and are positioned for engagement with the radially extending faces of the brake disc 14. As shown in FIGS. 1 and 2, the resultant torque forces from rotation of the disc 14 are transmitted from the friction lining carriers 35 and 36 directly to the side members 28 and 29. An inboard end 39 of caliper 26 has a generally oblong, noncylindrical recess 42 with sides extending perpendicular to the sides of the brake disc 14 for receiving a nut member or piston 43 in sliding engagement. The piston 43 has a threaded opening 44 with an axis parallel to the sides of the piston for engagement by a threaded shaft or screw 45.

An extension of the inboard end 39 of the caliper 26 such as cap 46 is fastened to the caliper as by welding and has sidewalls 47 spaced from and surrounding the piston 43. The screw 45 has a shank 48 which extends through a bushing 49 in the end of the cap 46.

A force-transmitting cylindrical flange 52 on the shank 48 of screw 45 is positioned within the cap 46 for retention by a collar 53. The collar 53 also envelops the bushing 49 of the cap 46. A washer or bearing 54 of a material having a low coefficient of friction may be positioned on the face of the collar 53 for sliding engagement with the flange 52 of the screw 45. Seal 55 between the collar 53 and shank 48, and seal 56 between the piston 43 and recess 42 in the caliper 26 may be provided to protect the sliding surfaces of the shank and piston.

The shank 48 of the screw 45 has a sliding connection with a shaft 57 to provide for rotation of the screw by the shaft while at the same time permitting longitudinal movement of the shank relative to the shaft. As shown in FIG. 2, the shaft 57 has a grooved opening 58 for receiving splines 59 in meshing relationship. The shaft 57 may be supported rotatably in a pillow block or other suitable bearing structure mounted on the axle 11 (not shown).

An arm 62 extends radially outward from the shaft 57 and has a pivotal connection 63 to a piston rod 64 of a piston-chamber assembly in which the chamber 65 is mounted on a bracket 66 fastened to the axle 11. The chamber 65 may be fluid actuated and in this embodiment is an air chamber of the diaphragm type with a spring return.

Between the arm 62 of the slack adjuster 67 and the shaft 57, a slack adjuster mechanism of a type well known in the art may be interposed to provide for adjusting the position of the pivotal connection 63 and arm (either automatically or manually) so that they will return to substantially the same position as the brake wears.

Threads 68 on the screw 45 and threads 69 in the thread opening 44 of the piston 43 have a helix angle and are of a pitch and shape to cause rotation of the rotatable screw 45 in the opposite direction upon release of the clamping force exerted by the piston 43 against the lining carrier 35 and thereby dissipate the clamping force. Preferably the threads 68 and 69 have a long lead and are standard acme threads. The threads 68 of the screw 45 have preferably multiple thread starts and in the embodiment shown there are four thread starts. The screw 45 has an outside diameter of 1-½ inch and a lead of 1¾ inch.

In FIGS. 1 and 2, the brake 10 is shown in a condition where the air pressure has been applied to chamber 65 and the piston rod 64 has been extended, thus turning the arm 62 in a clockwise direction as shown in FIG. 1. The shaft 57 has turned the screw 45 having left-hand thread members in a clockwise direction, as shown in FIG. 2, urging the piston 43 against the lining carrier 35 causing the friction lining 37 to be pressed into frictional engagement against the rotating brake disc 14. At the same time, the flange 52 of the screw 45 has applied a force in the opposite direction against the collar 53 of the caliper 26. This resultant force is conveyed through the caliper 26 to the lining carrier 36 which presses the friction lining 38 against the brake disc 14 at the outboard side of the brake. The resultant torque forces from the rotation of the disc 14 are transmitted from the friction lining carriers 35 and 36 directly to the side members 28 and 29.

When the force applied by the chamber 65 is released, the helix angle of the threads 68 and the brake clamping force produce an overhauling torque to rotate the screw. This is due to the potential energy stored in the brake disc 14 and friction lining 37 and friction lining 38 which is converted into kinetic energy and acts on the screw 45 through screw threads 68 and piston threads 69 to rotate the screw in a counterclockwise direction as shown in FIG. 1. The rotating overhauling torque is transmitted through the splines 59 and grooved opening 58 to the shaft 57 and then through the slack adjuster 67 to rotate the arm 62 in a counterclockwise direction as shown in FIG. 1. The adjustment for lining and disc wear is provided by either the automatic slack adjuster 67 which senses brake lining wear and automatically adjusts for this wear or by a manual slack adjuster which has to be turned periodically for lining wear. The long lead of the screw 45 and the multiple threads transmit the force from the friction linings 37, 38 and brake disc 14 by rotation of the screw in the reverse direction and thus return all system forces to substantially zero.

As the friction lining 37 and friction lining 38 wear, the piston 43 will be moved to the right relative to the brake disc 14 as shown in FIG. 2 and the caliper 26 will move to the left relative to the brake disc. This movement does not affect the rotating power shaft 57 and piston rod 64 or chamber 65 because the screw shank 48 is slidable in the grooved opening 58 of the shaft.

Figure 5:
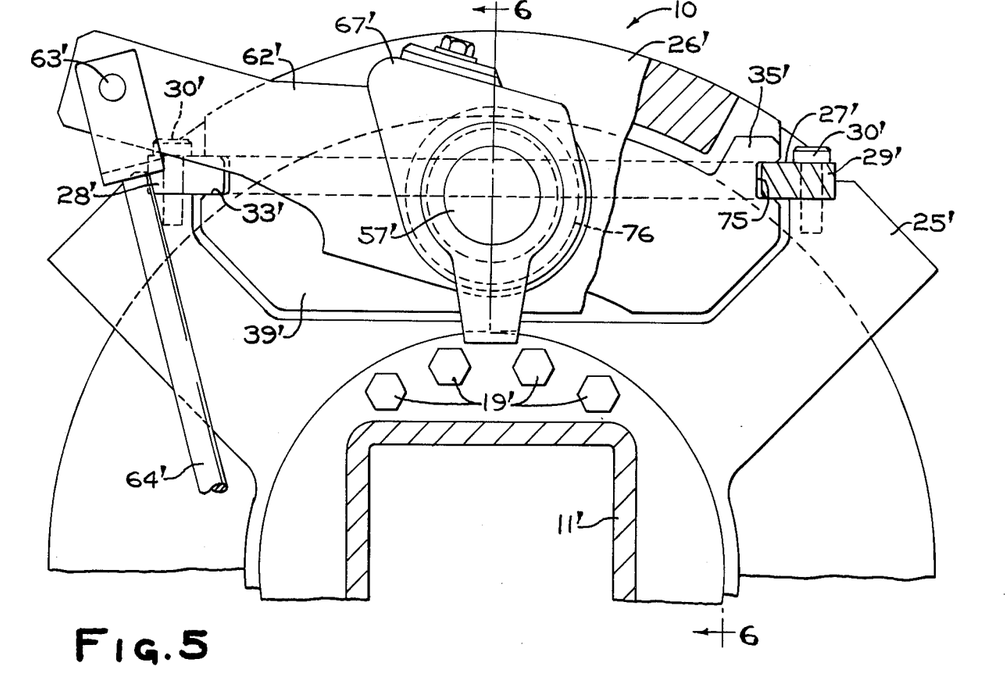
FIG. 5 is a fragmentary end elevation like FIG. 1 of the inboard side of a modification of the invention with additional parts being broken away.
Figure 6:
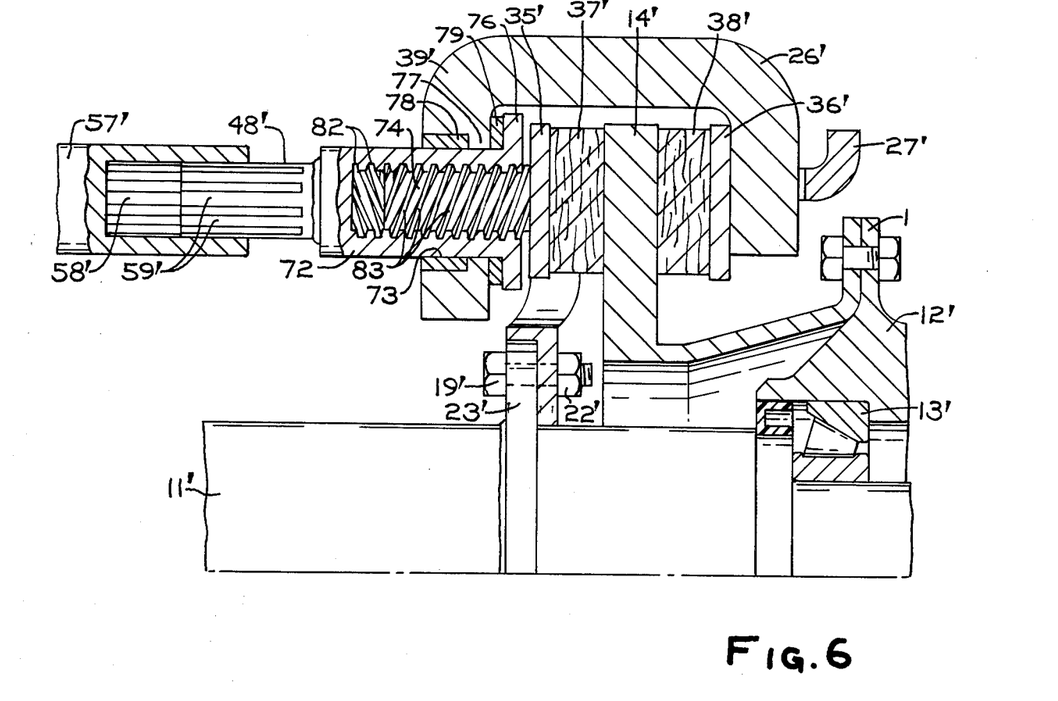
FIG. 6 is a fragmentary sectional view like FIG. 2 taken along the plane of line 6—6 of FIG. 5 with parts being broken away.

With reference to FIGS. 5 and 6, a modification is shown in which a rotating nut or cylindrical sleeve 72 is rotatably mounted in a cylindrical recess or opening 73 in the inboard end 39' of caliper 26'. The sleeve 72 has a shank 48' with splines 59' for sliding engagement with grooves in the grooved opening 58' of shaft 57'.

A screw 74 is mounted on inboard lining carrier 35' which has notches 75 at each side for sliding engagement with side members 28' and 29' of U-shaped bracket 27'. Rotation of the screw 74 is prevented by engagement of the lining carrier 35' with the side members 28' and 29'; however, movement of the lining carrier toward or away from the brake disc 14' is permitted.

The sleeve 72 has a radially extending flange 76 at the outboard end with edges overlapping a shoulder 77 of the opening 73 in the inboard end 39' of the caliper 26'. A bushing 78 of a material having a low coefficient of friction may be provided in the cylindrical opening 73 and a washer 79 of a material having a low coefficient of friction may be provided between the flange 76 of the sleeve 72 and the shoulder 77 of the caliper 26'. The sleeve 72 has threads 82 for receiving the threads 83 of screw 74. The threads 83 of the screw 74 have a long lead and in this modification the screw threads have an outside diameter of 1½ inch and a lead of 1¾ inch. The threads 83 Are acme standard and preferably multiple threads which in this modification consist of four thread starts on the screw. The outer brake parts of this modification correspond with the brake parts of the embodiment of FIGS. 1 and 2 which are designated in the drawings by the same numbers with the addition of the prime symbol.

In operation of the modification of FIGS. 5 and 6, the brake is applied as described hereinabove for the embodiment of FIGS. 1 through 4 by applying air pressure to the chamber 65' (not shown) causing the piston rod 64' to move upward as shown in FIG. 5 and rotate the arm 62' in a clockwise direction. This motion is transmitted through the slack adjuster 67' to rotate the shaft 57' and thereby rotate the shank 48' and the sleeve 72.

As the shaft 57' is turned in a clockwise direction, the sleeve 72 rotates and urges the screw 74 and lining carrier 35' toward the brake disc 14'. At the same time, the flange 76 on the sleeve 72 applies force on the shoulder 77 of the caliper 26' which in turn applies force on the outboard lining carrier 36' in a direction toward the brake disc 14'. In this way, the clamping force is applied to the friction lining 37' and the friction lining 38' against the brake disc 14' providing the desired clamping action and braking of disc rotation.

When the air pressure in chamber 65' is released the spring in the chamber exerts a restoring force on piston rod 64' and at the same time the helix angle of threads 82 and 83 is large enough so that the potential energy stored in the disc 14' and linings 37' and 38' is converted into kinetic energy and rotates the sleeve 72 under the overhauling screw torque in a counterclockwise direction as shown in FIG. 5. This overhauling torque rotates the power shaft 57' which is connected to the arm 62' through slack adjuster 67'. The automatic slack adjuster 67' provides automatic adjustment for lining and disc wear so that the pivotal connection 63' is returned to substantially the same position everytime even though the sleeve 72 is not rotated in a counterclockwise direction for left-hand threads back to the original position because of the adjustment for wear of linings 37' and 38'. If a manual slack adjuster 67' is used, manual adjustments must be made periodically to correct for lining wear.

Figure 7:
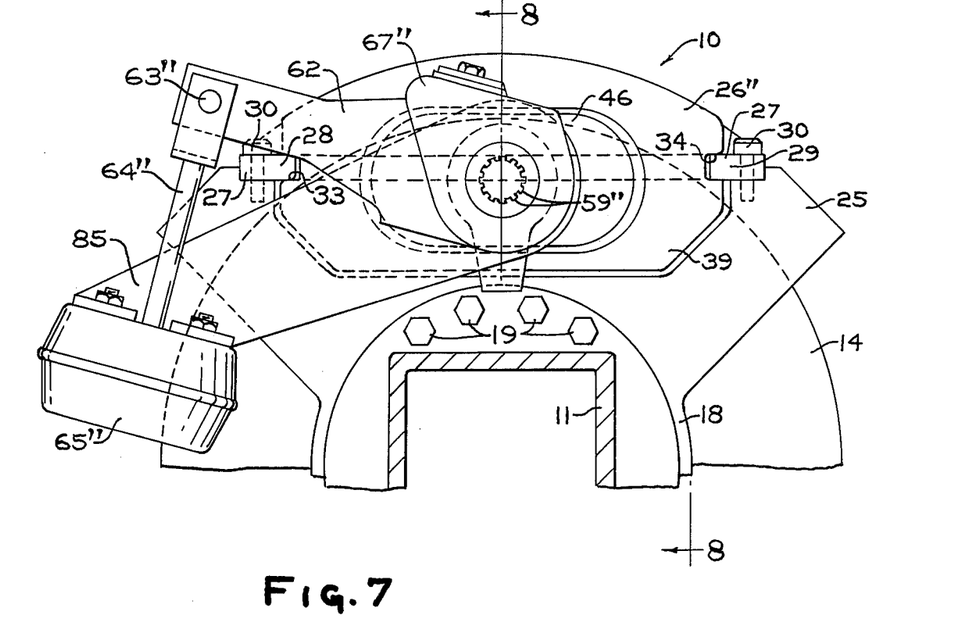
FIG. 7 is a fragmentary end elevation like FIG. 1 of the inboard side of a further modification of the invention with additional parts broken away.
Figure 8:
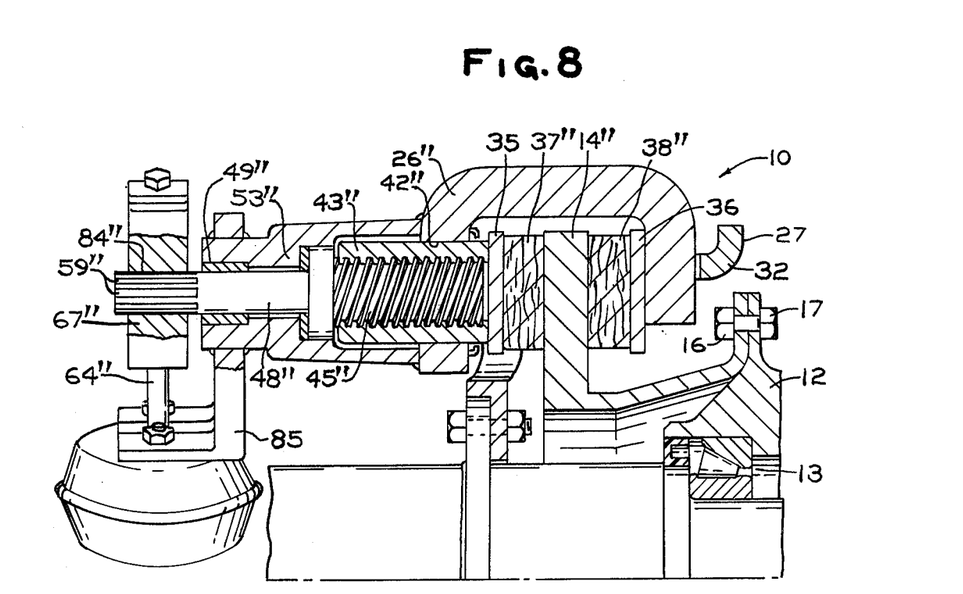
FIG. 8 is a fragmentary sectional view like FIG. 2 taken along the plane of line 8—8 of FIG. 7 with parts being broken away.

With reference to FIGS. 7 and 8, a further modification is shown in which the slack adjuster 67" is slidably mounted directly on shank 48" and the air chamber 65" is bolted to a bracket 85 welded to the cap 46" of the caliper 26". As shown in FIG. 7, the slack adjuster 67" has a grooved opening 84 for receiving splines 59" in meshing relationship in a sliding connection to provide for rotation of the screw 45" by the slack adjuster while at the same time permitting allowance for misalignment or longitudinal movement of the shank relative to the slack adjuster.

The arm 62" of the slack adjuster 67" extends radially outward from the shank 48" and has a pivotal connection 63" to a piston rod 64" of the piston-chamber assembly.

The slack adjuster 67" has a two-point support with the first being the shank 48" through bearing 49" to collar 53" and the second being the screw 45" through piston 43" to noncylindrical recess 42". The slack adjuster mechanism 67" is of a type well known in the art and to provide for adjusting the position of the pivotal connection 63" and arm 62" (either automatically or manually) so that they will return to substantially the same position after each actuation of the brake as the brake wears.

The operation of the modification shown in FIGS. 7 and 8 is substantially the same as the operation of the embodiment shown in FIGS. 1 through 4; however, in this modification, no shaft 57 with a grooved opening 58 providing a sliding connection between the shank 48 and shaft is required because the piston-chamber assembly is mounted on the caliper 26" for movement with the caliper. Accordingly, as the friction linings 37" and 38" wear and the caliper 26" moves to the left relative to the disc 14", as shown in FIG. 8, the air chamber 65" will move the same distance to the left. The shank 48" of the screw 45" will also move to the left with the caliper 26" as the slidable piston 43" is moved to the right, as shown in FIG. 8, to compensate for wear of the linings 37" and 38". The slack adjuster 67" compensates for the difference between the rotation of the piston 43" in the clockwise direction, as shown in FIG. 7, and the rotation in the counterclockwise direction due to wear of the friction linings 37" and 38".

Figure 9:
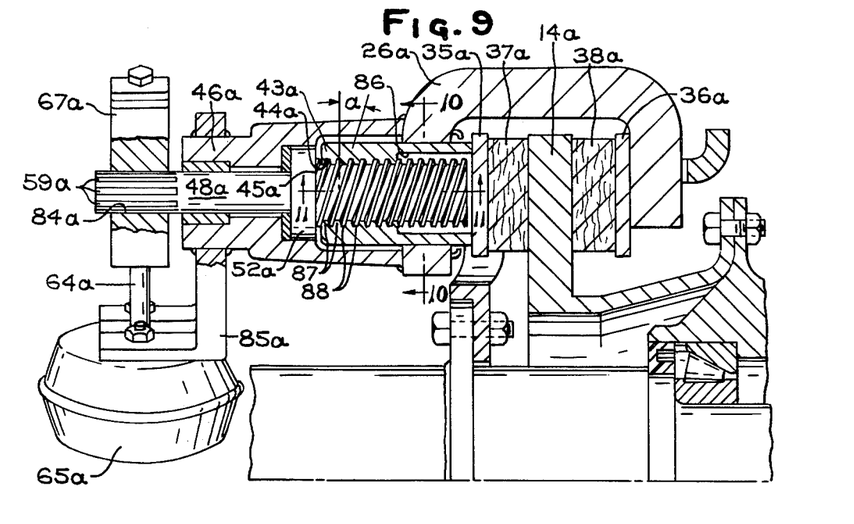
FIG. 9 is a fragmentary sectional view like FIG. 8 of a still further modification of the invention with parts being broken away.
Figure 10:
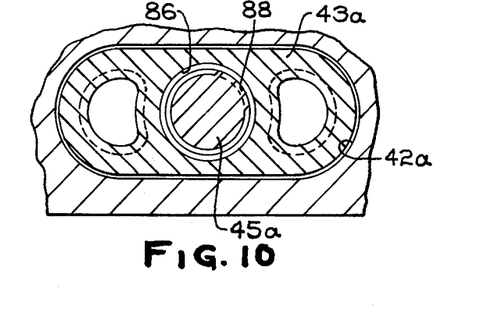
FIG. 10 is an enlarged fragmentary sectional view taken along the plane of line 10—10 of FIG. 9.
Figure 11:
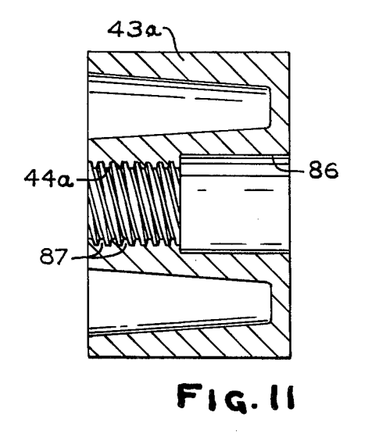
FIG. 11 is a longitudinal sectional view of the sliding piston taken along the plane of line 11—11 of FIG. 9.

The modification shown in FIGS. 9, 10 and 11 is like the construction of FIGS. 7 and 8 except the threaded opening 44a in the slidable piston 43a has an undercut counterbored cylindrical portion 86 adjacent the lining carrier 35a. Preferably, threads 87 of the piston 43a extend along the threaded opening 44a for a distance not greater than one-half the length of the piston. The threads 87 of the piston 43a are in threaded engagement with threads 88 on screw 45a.

Helix angle $(a)$ of the threads 87 of the piston 43a is small enougn to provide the necessary force against the lining carriers 35a and 36a with the available torque and large enough so that the screw will overhaul or be rotated upon release of the braking torque applied by the piston cylinder assembly 65a. The threads 87 are Acme standard on screw 45a and have an outside diameter of from 1.250 inches to 1.50 inches for a service brake of the 20 inch flatbase rim design subject to dynamic braking. The number of thread starts is a function of the outside diameter and may range from 4 for a screw having an outside diameter of 1.250 inches to 8 thread starts for a screw with an outside diameter of 1.50 inches. Likewise, the pitch of the threads 87 which is the thread lead divided by the number of thread starts may range from 0.188 inches to 0.250 inches. Pitch diametes also range from 1.375 inches to 1.417 inches. For parking brakes with static loading, it has been found that a smaller size screw 45a can be used.

In the embodiment shown in FIGS. 9, 10 and 11, the following thread dimension have been used for a brake in which the braking force W applied is 43,000 pounds:

Standard Acme Threads
$x$ - Thread Angle - 14.5 degrees
Outside Diameter - 1.50 inches
Thread starts - 8
Lead - 2.00 inches
Pitch - 0.250 inches
Depth of Thread - 0.125 inches
$D$ - Pitch Diameter - 1.375 inches
$r$ - Pitch Radius - 0.6875 inches
$a$ - Helix Angle - 24.843 degrees
$m$ - Coefficient of Friction - 0.2

This screw 45a is overhauling and will rotate upon release of the braking torque on the shank 48a of the screw as is calculated through the use of the following formula from page 205 of "Design of Machine Elements" by M. F. Spotts — Third Edition published by Prentice Hall:

TL is the torque required to lower or release the load which in this case is 43,000 pounds braking force W.

$$TL = rW\left[ -\frac{\cos y \tan a - m}{\cos y + m \tan a} \right]$$

$y$ = the angle between Fn (force vector) and a tangential plane
Tan $y$ = Tan $x$ Cos $a$
 = (Tan 14.5°) (Cos 24.843°)
 = (0.25826) (0.90745)
 = 0.23468
Cos $y$ = 0.97354
Tan $a$ = Tan 24.843°
 = 0.46299

$$TL = 0.6875(43,000)\left[ -\frac{(.97354)(.46299) - 0.2}{.97354 + 0.2(.46299)} \right]$$

TL = − 6952 inch-pounds torque indicating by the negative result that the screw is overhauling.

The braking torque T required to apply the 43,000-pound braking force W is calculated in a similar way by using the following formula from the same text:

$$T = rW \left[ \frac{\cos y \tan a + m}{\cos y - m \tan a} \right]$$

$$T = .6875(43,000) \left[ \frac{(.97354)(.46299) + 0.2}{.97354 - 0.2(.46299)} \right]$$

$T = 21,837$ inch-pounds torque required to apply 43,000 pounds braking force

It can therefore be seen that the helix angle ($a$) for the thread 88 on the screw 45a is small enough to provide the necessary force W with the available torque T and is large enough to provide an overhauling torque TL to rotate the screw upon release of the braking torque T.

The efficiency of the screw 45a is determined by the following formula from page 205 in the same text:

$$\text{efficiency} = \frac{\cos y - m \tan a}{\cos y + m \cot a}$$

$$= \frac{.97354 - 0.2(.46299)}{.97354 + 0.2(2.1599)}$$

$$= .6268 \text{ or } 62.68\%$$

It can be shown that a power screw of the type used in the embodiment of this invention has a very low mechanical efficiency when the helix angle ($a$) is in the neighborhood of either 0° or 90°. At helix angle ($a$) of 24° the efficiency is close to the maximum.

Various combinations of thread outside diameter, lead, number of thread starts, coefficient of friction, depth of thread and thread configuration produce varying degrees of performance. For example, with a required and defined braking force W the following changes in performance are produced by the enumerated changes in the threads:

1. For a given outside diameter and a given lead, an increase in the number of thread starts will increase the required braking torque T and decrease the overhauling torque TL. Also the efficiency will be decreased.

2. For a given outside diameter and a given number of thread starts, an increase in lead will produce an increase in the required braking torque T, an increase in efficiency and an increase in the overhauling torque TL.

3. For a given number of thread starts and a given lead, an increase in the outside diameter will produce an increase in the required braking torque T, a decrease in efficiency and a decrease in the overhauling torque TL.

As in the modification of FIGS. 7 and 8, the slack adjuster 67a is slidably mounted directly on shank 48a and the air chamber 65a is bolted to a bracket 85a welded to the cap 46a of the caliper 26a. The splines 59a on the shank 48a fit in a grooved opening 84a of the slack adjuster 67a in meshing sliding relationship to provide for rotation of the screw 45a by the slack adjuster while at the same time permitting allowance for misalignment or longitudinal movement of the shank relative to the slack adjuster. The arm 62a of the slack adjuster 67a is pivotally connected to the piston rod 64a of the piston-chamber assembly containing air chamber 65a.

The operation of the modification shown in FIGS. 9 through 11 is substantially the same as the operation of the embodiment shown in FIGS. 7 and 8. The required braking torque T is applied to screw 45a by the air pressure in air chamber 65a moving piston rod 64a upwards as shown in FIG. 9 and rotating the slack adjuster turning the screw in the counterclockwise direction as shown in FIG. 10 to produce a braking force W of said piston 43a against the friction lining carrier 35a. This braking force W is also transmitted through flange 52a of the screw 45a and the caliper 26a to the friction lining carrier 36a. Accordingly, the friction linings 37a and 38a clamp the disc 14a with a force W which in the embodiment shown is around 43,000 pounds.

When the braking torque T is released by reducing the air pressure in air chamber 65a, the overhauling torque TL is negative and accordingly the screw 45a will be turned in the clockwise direction as shown in FIG 10 to immediately remove the braking pressure of linings 37a and 38a on disc 14a. In the present embodiment, the overhauling torque TL is approximately 6952-inch pounds. This immediate release of braking pressure E is important especially where skid control apparatus is installed with a brake. The time required for the release of the clamping pressure force is critical in many instances where there is automatic skid control.

With the cylindrical postion 87 of opening 44 being undercut, the stress distribution of the forces transmitted by the threads 87 and 88 is improved and the short length of the threads 87 provides a construction which is economical to manufacture. In addition, where the friction linings 37a are metallic or of semiheatconducting material, the air space in the cylindrical portion 86 will provide dead air insulation to keep the screw 45a and connecting parts relatively cool. The short length of the threads 87 and the cylindrical portion 86 also permits greater adjustability of the piston 43a to move in the noncylindrical recess 42a to conform with the face of friction lining carrier 35a. As the friction linings 37a and 38a wear, there may be tilting of the friction lining carriers and this can be compensated for by the construction of the piston 43a as shown in FIGS. 9 through 11.

With the unique construction of this invention an air chamber, overhauling power screw, manual or automatic slack adjuster and rotating shaft power application can be utilized with a floating caliper brake. It is understood that the principle of this invention may be utilized with other forms of braking power for turning a threaded sleeve or screw as defined in the following claims.

We claim:

1. A disc brake comprising a nonrotatable mounting member, a housing in sliding engagement with said mounting member, a brake disc rotatable about an axis, a first friction lining carrier located on one side of said disc and in sliding engagement with said mounting member, said first friction lining carrier having a first friction lining movable into and out of clamping engagement with said disc, a screw and nut assembly including two actuating members in threaded engagement, one of said actuating members being in force-transmitting engagement with said housing in the axial direction relative to said disc and the other of said actuating members being in force-transmitting engagement with said friction lining carrier in the axial direction relative to said disc, means to hold a first member of said actuating members against rotation relative to said mounting member and means to apply torque and rotate a second member of said actuating members relative to said first member in one direction to generate an axial force urging said first member axially relative to said mounting member to apply a brake clamping force on said brake disc with the resultant torque forces from rotation of said disc being transmitted from said friction lining carrier directly to said mounting member, said actuating members being subject only to said axial force and said torque for rotating said second member relative to said first member of said actuating members, said actuating members having threads with a helix angle which is small enough to provide said brake clamping force upon applying braking torque to said second member in a first direction of rotation and said helix angle being large enough to generate an overhauling torque from said clamping force which is sufficient by itself to rotate said second member in a second direction opposite to said first direction upon release of said braking torque whereby said brake clamping force is released without the application of additional force to rotate said second member in said second direction.

2. A disc brake according to claim 1 wherein said overhauling torque is calculated by the following formula:

$$TL = rW\left[\frac{\cos y \operatorname{Tan} a - m}{\cos y + m \operatorname{Tan} a}\right]$$

where
TL is overhauling torque in inch-pounds
r is pitch radius in inches
W is braking force in pounds
y is the angle between the force vector and tangential plane of said threads
a is helix angle
m is coefficient of friction
said helix angle and coefficient of friction being of a magnitude wherein TL is a negative figure indicating that there is overhauling torque and no additional torque need be applied to rotate said second member in said second direction.

3. A disc brake according to claim 1 wherein said second member is a screw member and said first member is a nut member, said screw member being in force-transmitting engagement with said housing and said nut member being in force-transmitting engagement with said friction lining carrier, means to hold said nut member against rotation relative to said housing and means to apply torque and rotate said screw member relative to said housing in said first direction to move said nut member axially relative to said housing to exert a clamping force on said friction lining carrier whereby said screw member is rotated in said second direction upon release of said torque.

4. A disc brake according to claim 3 wherein said screw member has a shank with a flange and said housing has a collar through which said shank extends providing a surface of said housing for engagement with said flange to limit axial movement of said screw member relative to said housing in a direction away from said disc member.

5. A disc brake according to claim 3 wherein said nut member has an undercut cylindrical portion adjacent said lining carrier with a diameter greater than the diameter of said screw.

6. A disc brake according to claim 5 wherein said threads of said nut member extend for a distance not greater than one-half the length of said nut member.

7. A disc brake according to claim 6 wherein said undercut cylindrical portion has a length approximately one-half the length of said nut member.

8. A disc brake according to claim 1 wherein said first member is a screw member and said second member is a nut member, said nut member being in force-transmitting engagement with said housing and said screw member being in force-transmitting engagement with said friction lining carrier, means to hold said screw member against rotation relative to said housing and means to apply torque and rotate said nut member relative to said housing in said first direction to move said screw member axially relative to said housing to exert a clamping force on said friction lining carrier whereby said nut member is rotated in said second direction upon release of said torque.

9. A disc brake according to claim 1 wherein said housing is a floating caliper member with two spaced-apart portions on opposite sides of said disc, said screw and nut assembly being mounted on one of said portions for exerting a clamping force on said first friction lining carrier located on one side of said disc, a second friction lining carrier located on the other side of said disc and in sliding engagement with said mounting member, said second friction lining carrier having a second friction lining movable into and out of braking engagement with said disc, the other of said portions of said caliper member being in force-transmitting engagement with said second friction lining carrier for the application of a brake clamping force on said brake disc with the resultant torque forces from rotation of said disc being transmitted from said second friction lining carrier directly to said mounting member upon movement of said first member relative to said mounting member whereby said caliper member exerts a clamping force on said second friction lining carrier and said second member is rotated in said second direction upon release of said braking torque.

10. A disc brake according to claim 9 wherein a torque-transmitting shaft is connected to said second member, said means to apply torque further comprising power means mounted on said caliper member for axial movement relative to said disc with said caliper member and said power means being connected to said shaft for rotation of said shaft under braking torque in one direction to exert a clamping force on said friction lining carriers and to release said braking torque and permit rotation of said shaft in said second direction due to said overhauling torque.

* * * * *

UNITED STATES PATENT AND TRADEMARK OFFICE
CERTIFICATE OF CORRECTION

PATENT NO. : 4,036,330
DATED : July 19, 1977
INVENTOR(S) : DALE A. HENNING and JACK D. RAINBOLT It is certified that error appears in the above-identified patent and that said Letters Patent are hereby corrected as shown below:

In the Abstract, line 4, "rotatble" should be ---rotatable---.

Column 2, line 18, "if" should be ---is---.

Column 6, line 23, "diametes" should be ---diameters---.

Column 8, line 21, "E" should be ---W---.

Signed and Sealed this

Thirtieth Day of May 1978

[SEAL]

Attest:

RUTH C. MASON
Attesting Officer

LUTRELLE F. PARKER
Acting Commissioner of Patents and Trademarks